(12) United States Patent
Marsh

(10) Patent No.: US 12,162,780 B2
(45) Date of Patent: Dec. 10, 2024

(54) DESALINATION SYSTEMS AND METHODS

(71) Applicant: Blue Mountain International, LLC, Cheney, WA (US)

(72) Inventor: James Marsh, Cheney, WA (US)

(*) Notice: Subject to any disclaimer, the term of this patent is extended or adjusted under 35 U.S.C. 154(b) by 613 days.

(21) Appl. No.: 17/109,725

(22) Filed: Dec. 2, 2020

(65) Prior Publication Data

US 2021/0171366 A1 Jun. 10, 2021

Related U.S. Application Data

(60) Provisional application No. 62/945,781, filed on Dec. 9, 2019.

(51) Int. Cl.
| | |
|---|---|
| *C02F 1/26* | (2023.01) |
| *C02F 1/36* | (2023.01) |
| *C02F 1/469* | (2023.01) |
| C02F 101/12 | (2006.01) |
| C02F 103/08 | (2006.01) |

(52) U.S. Cl.
CPC ............... *C02F 1/265* (2013.01); *C02F 1/36* (2013.01); *C02F 1/469* (2013.01); *C02F 2101/12* (2013.01); *C02F 2103/08* (2013.01); *C02F 2201/46135* (2013.01); *C02F 2201/4618* (2013.01)

(58) Field of Classification Search
None
See application file for complete search history.

(56) References Cited

U.S. PATENT DOCUMENTS

| | | | |
|---|---|---|---|
| 2003/0146158 A1* | 8/2003 | Mayer | B01D 61/145 210/695 |
| 2010/0264010 A1* | 10/2010 | Pallanca | C02F 1/04 202/175 |
| 2019/0308889 A1* | 10/2019 | Weng | B01D 1/28 |

* cited by examiner

*Primary Examiner* — Madeline Gonzalez
(74) *Attorney, Agent, or Firm* — Perkins Coie LLP

(57) ABSTRACT

A desalination system includes a container for holding a reservoir of liquid salt Water, and an ultrasound transmitter for generating ultrasound Waves to generate an aerosol of saltwater particles at a surface of the reservoir of liquid sale Water. The aerosol is conveyed through a conduit having first and second side Walls, wherein the first and second side Walls are electrically conductive and oppositely charged, which separates electrically charged aerosolized particles from neutrally charged aerosolized particles. The neutrally charged aerosolized particles are then condensed after passing through the conduit to form a body of Water having a lower salinity than the reservoir of liquid saltwater.

10 Claims, 1 Drawing Sheet

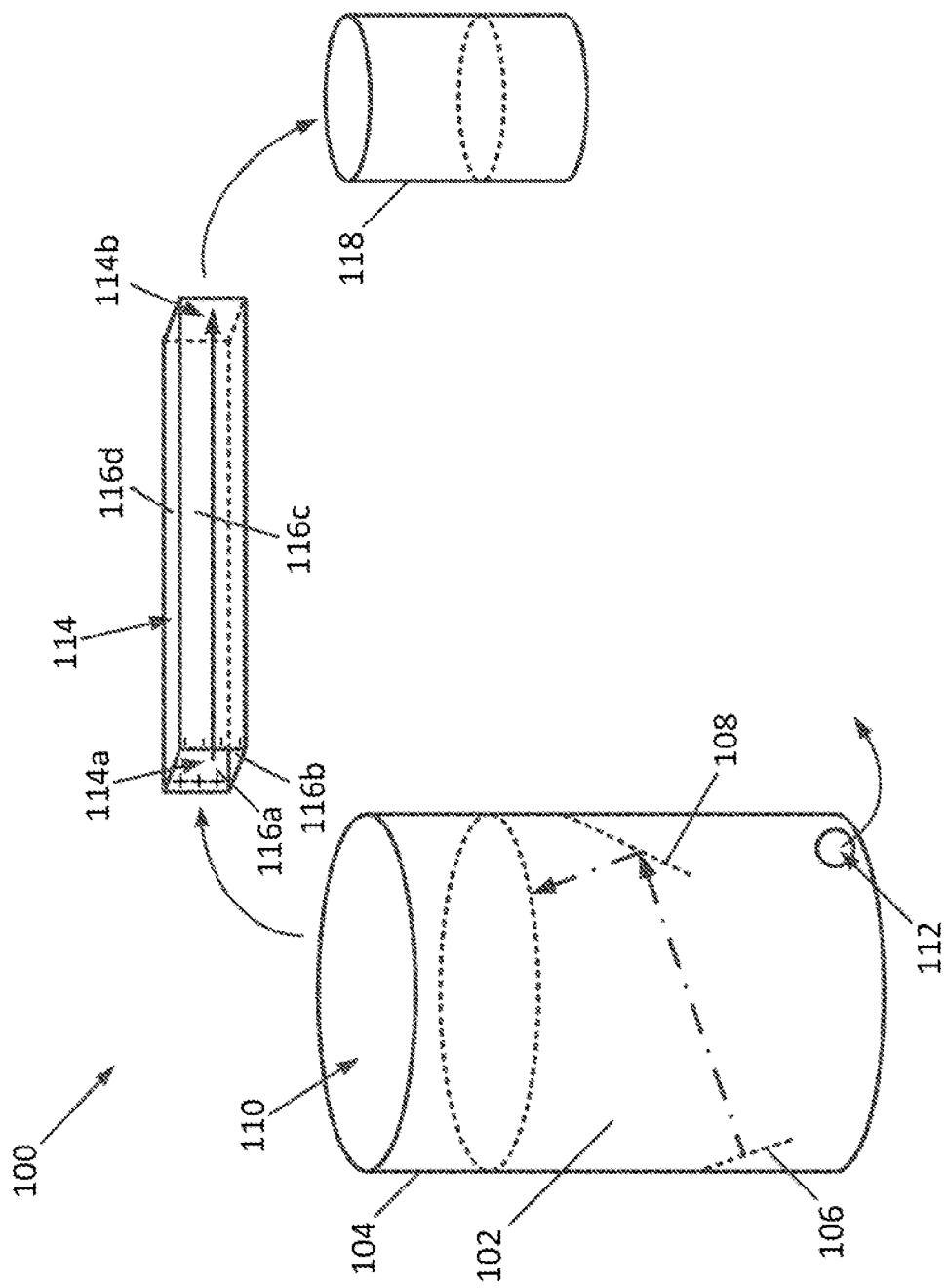

DESALINATION SYSTEMS AND METHODS

BACKGROUND

The present disclosure relates generally to improved desalination systems and methods, and more specifically, to improved desalination systems and methods that remove mineral and/or saline components from liquids such as water by aerosolizing the liquid.

Potable water is a limited resource. While there is an extremely large quantity of total water on this planet, the amount of water that is potable is quite a small percentage, particularly with respect to the rapidly growing population on this planet. Accordingly, demand for clean, potable water is quickly increasing as human population and industrial activity increases. Additionally, water supplies are expected to decrease as existing aquifers and other sources are depleted. While current desalination techniques exist, none have been entirely successful due to the techniques being expensive, time consuming, and inefficient. Some previous desalination techniques include aerosolizing a source of salt water, transferring the aerosol away from the source, and condensing the aerosol back into a body of liquid water. This process has been shown to marginally reduce the salinity of the water. Nevertheless, improvements to the effectiveness and/or efficiency of such techniques would increase the availability, and decrease the cost, of potable water.

Accordingly, there is a continuing and growing need for improved desalination techniques.

SUMMARY

The present disclosure relates more specifically to desalination techniques that use ultrasound to aerosolize a saline liquid such as salt water, and electrical and/or magnetic techniques to remove saline particles from the aerosol, as well as to systems for performing such techniques.

A desalination system according to at least one implementation may be summarized as including a container configured to hold liquid salt water, an ultrasound transmitter located inside the container that generates ultrasound waves and produces an aerosol of salt water particles at a surface of the reservoir of liquid salt water, an acoustic deflection plate positioned and oriented to deflect the ultrasound waves from the ultrasound transmitter to the surface of the reservoir of liquid salt water, a conduit including a first side wall, a second side wall, an entry configured to receive the aerosolized particles, and an exit, wherein the first side wall is electrically conductive and positively charged and the second side wall is electrically conductive and negatively charged, wherein the conduit conveys the aerosol between the first and second side walls and from the entry to the exit, wherein some aerosolized particles contain Na+ ions, have a positive charge, and are attracted to the negatively charged second side wall, and wherein some other aerosolized particles contain Cl– ions, have a negative charge, and are attracted to the positively charged first side wall, and wherein some other aerosolized particles are electrically neutral, and wherein a surface of the first side wall has a first hydrophilic coating and a surface of the second side wall has a second hydrophilic coating, and wherein the hydrophilic coatings cause the charged aerosolized particles to stick to the side walls when contact is made between the charged aerosolized particles and a hydrophilic coated side wall, thereby separating charged aerosolized particles from neutral aerosolized particles.

Dimensions of the container may be configured and acoustically tuned to enable the ultrasound waves to resonate within the container. The ultrasound transmitter may be configured and acoustically tuned to enable the ultrasound waves to resonate within the container. The ultrasound transmitter may be located inside the reservoir of liquid salt water. The ultrasound transmitter may be oriented at an oblique angle to an orientation of gravity. The acoustic deflection plate may be located inside the reservoir of liquid salt water. The acoustic deflection plate may be oriented at an oblique angle to an orientation of gravity. The acoustic deflector including an acoustic lens feature that improves the resonant tuning of the container. The container may include a drain. The first side wall may be separated from and opposed to the second side wall. The first side wall may be parallel to the second side wall. The conduit may include a plurality of drains. The saltwater particles may have diameters between 3 and 5 microns. The conduit may include a blade configured to reduce a turbulence of the flow of the aerosol through the conduit.

A desalination system may be summarized according to at least one implementation as including a container configured to hold liquid salt water, an ultrasound transmitter located inside the container and configured to generate ultrasound waves to generate an aerosol of salt water particles at a surface of the reservoir of liquid salt water, and a conduit including a first side wall, a second side wall, an entry configured to receive the aerosol, and an exit, wherein the first side wall is electrically conductive and positively charged and the second side wall is electrically conductive and negatively charged and wherein the conduit is configured to convey the aerosol between the first and second side walls and from the entry to the exit.

Dimensions of the container may be configured to allow the ultrasound waves to resonate within the container. The ultrasound transmitter may be configured to allow the ultrasound waves to resonate within the container. The ultrasound transmitter may be located inside the reservoir of liquid salt water. The ultrasound transmitter may be oriented at an oblique angle to an orientation of gravity. The conduit may convey the aerosol between the first and second side walls and from the entry to the exit, wherein the aerosolized particles contain Na+, may have a positive charge, and may be attracted to the negatively charged second side wall, and wherein the aerosolized particles contain Cl–, may have a negative charge, and may be attracted to the positively charged first side wall.

The desalination system may further include an acoustic deflection plate positioned and oriented to deflect the ultrasound waves from the ultrasound transmitter to the surface of the reservoir of liquid salt water. The acoustic deflection plate may be located inside the reservoir of liquid salt water. The acoustic deflection plate may be oriented at an oblique angle to an orientation of gravity. The container may include a drain. The first side wall may be separated from and opposed to the second side wall. The first side wall may be parallel to the second side wall. The conduit may include a plurality of drains. The saltwater particles may have diameters between 3 and 5 microns.

A surface of the first side wall may have a first hydrophilic coating and a surface of the second side wall may have a second hydrophilic coating, wherein the hydrophilic coatings may cause the charged aerosolized particles to stick to the side walls when contact is made between the charged aerosolized particles and a hydrophilic coated side wall, thereby separating charged aerosolized particles from neutral aerosolized particles. The conduit may include a blade configured to reduce a turbulence of the flow of the aerosol through the conduit.

A method of desalinating salt water may be summarized according to at least one implantation as including supplying liquid salt water to a container, generating an aerosol of salt water particles at a surface of the reservoir of salt water; conveying the aerosolize particles through a conduit having a first side wall and a second side wall, wherein the first side wall is electrically conductive and positively charged and the second side wall is electrically conductive and negatively charged, which separates electrically charged aerosolized particles from electrically neutral aerosolized particles, and condensing the aerosol conveyed through the conduit.

The method may further include applying an electromagnetic frequency to the reservoir of liquid salt water. Conveying the aerosol may include using a fan to convey the aerosol. Conveying the aerosol may include conveying the aerosol under laminar flow conditions.

The method may further include supplying the condensed aerosol to a second container, generating a second aerosol of saltwater particles from the condensed aerosol in the second container, conveying the second aerosol through a second conduit having a third side wall and a fourth side wall, wherein the third side wall is electrically conductive and positively charged and the fourth side wall is electrically conductive and negatively charged, and condensing the second aerosol conveyed through the second conduit.

In another implementation, a desalination system is provided that includes: a container configured to hold liquid salt water; an ultrasound transmitter located relative to the container and configured to generate ultrasound waves for generating an aerosol of salt water particles at a surface of the liquid salt water, and a conduit including a first side wall, a second side wall, an entry configured to receive the aerosol, and an exit, wherein the first side wall is positively charged and the second side wall is negatively charged and wherein the conduit is configured to convey the aerosol between the first and second side walls and from the entry to the exit.

In at least one embodiment, the dimensions of the container are configured for the ultrasound waves to resonate within the container.

In at least one embodiment, the ultrasound transmitter is configured for the ultrasound waves to resonate within the container.

In at least one embodiment, the ultrasound transmitter is located inside the liquid salt water.

In at least one embodiment, the ultrasound transmitter is oriented at an oblique angle to an orientation of gravity.

In at least one embodiment, the conduit conveys the aerosol between the first and second side walls and from the entry to the exit, wherein the aerosolized particles contain Na+ that are attracted to the negatively charged second side wall, and wherein the aerosolized particles contain Cl−, that are attracted to the positively charged first side wall.

In at least one embodiment, the system further includes an acoustic deflection plate positioned and oriented relative to the container to deflect the ultrasound waves from the ultrasound transmitter to the surface of the reservoir of liquid salt water.

In at least one embodiment, the acoustic deflection plate is located inside the liquid salt water.

In at least one embodiment, the acoustic deflection plate is oriented at an oblique angle to an orientation of gravity.

In at least one embodiment, the first side wall is separated from and opposed to the second side wall.

In at least one embodiment, the first side wall is parallel to the second side wall.

In at least one embodiment, the aerosol saltwater particles have diameters between 3 and 5 microns.

In at least one embodiment, a surface of the first side wall has a first hydrophilic coating and a surface of the second side wall has a second hydrophilic coating, and wherein the hydrophilic coatings cause the charged aerosolized particles to separate from neutral aerosolized particles.

In at least one embodiment, the conduit includes a blade configured to reduce a turbulence of the flow of the aerosol through the conduit.

In at least one embodiment, the acoustic deflector includes an acoustic lens that improves the resonant tuning of the container.

In at least one implementation, a method for desalinating salt water is provided that includes supplying a container of liquid salt water; generating an aerosol of saltwater particles at a surface of the reservoir of salt water, conveying the aerosolize particles through a conduit having a first side wall and a second side wall, wherein the first side wall is positively charged and the second side wall is negatively charged, which separates electrically charged aerosolized particles from electrically neutral aerosolized particles, and condensing the aerosol conveyed through the conduit.

In at least one embodiment, the method further includes applying an electromagnetic frequency to liquid salt water sufficient to decrease surface tension of the water and make the aerosol of saltwater particles more easily generated.

In at least one embodiment, conveying the aerosol includes using a fan to convey the aerosol.

In at least one embodiment, conveying the aerosol includes conveying the aerosol under laminar flow conditions.

In at least one embodiment, the method further includes: supplying the condensed aerosol to a second container, generating a second aerosol of saltwater particles from the condensed aerosol in the second container, and conveying the second aerosol through a second conduit having a third side wall and a fourth side wall, wherein the third side wall is positively charged and the fourth side wall is negatively charged, and condensing the second aerosol conveyed through the second conduit.

In at least one implementation, a desalination system is provided that includes: a container configured to hold a reservoir of liquid salt water; an ultrasound transmitter located inside the container that generates ultrasound waves and produces an aerosol of saltwater particles at a surface of the reservoir of liquid salt water, an acoustic deflection plate positioned and oriented to deflect the ultrasound waves from the ultrasound transmitter to the surface of the reservoir of liquid salt water, a conduit including a first side wall, a second side wall, an entry configured to receive the aerosolized particles, and an exit, wherein the first side wall is electrically conductive and positively charged and the second side wall is electrically conductive and negatively charged, wherein the conduit conveys the aerosol between the first and second side walls and from the entry to the exit, wherein some aerosolized particles contain Na+ ions, have a positive charge, and are attracted to the negatively charged second side wall, and wherein some other aerosolized particles contain Cl− ions, have a negative charge, and are attracted to the positively charged first side wall, and wherein some other aerosolized particles are electrically neutral, and wherein a surface of the first side wall has a first hydrophilic coating and a surface of the second side wall has a second hydrophilic coating, and wherein the hydrophilic coatings cause the charged aerosolized particles to stick to the side walls when contact is made between the charged aerosolized particles and a hydrophilic coated side wall, thereby separating charged aerosolized particles from neutral aerosolized particles.

In at least one embodiment, dimensions of the container are configured and acoustically tuned to enable the ultrasound waves to resonate within the container.

In at least one embodiment, the ultrasound transmitter is configured and acoustically tuned to enable the ultrasound waves to resonate within the container.

In at least one embodiment, the ultrasound transmitter is located inside the reservoir of liquid salt water.

In at least one embodiment, the ultrasound transmitter is oriented at an oblique angle to an orientation of gravity.

In at least one embodiment, the acoustic deflection plate is located inside the reservoir of liquid salt water.

In at least one embodiment, the acoustic deflection plate is oriented at an oblique angle to an orientation of gravity.

In at least one embodiment, the container includes a drain

In at least one embodiment, the first side wall is separated from and opposed to the second side wall.

In at least one embodiment, the first side wall is parallel to the second side wall.

In at least one embodiment, the conduit includes a plurality of drains.

In at least one embodiment, the saltwater particles have diameters between 3 and 5 microns.

In at least one embodiment, the conduit includes a blade configured to reduce a turbulence of the flow of the aerosol through the conduit.

Other aspects are apparent from the present disclosure and these aspects/embodiments are therefore not limiting.

BRIEF DESCRIPTION OF THE FIGURES

FIG. 1 illustrates a schematic view of a desalination system according to at least one implementation herein.

DETAILED DESCRIPTION OF THE INVENTION

Persons of ordinary skill in the art will understand that the present disclosure is illustrative only and not in any way limiting. Other implementations and various combinations of the presently disclosed system and method readily suggest themselves to such skilled persons having the assistance of this disclosure.

This detailed description is intended to teach a person of skill in the art details for practicing aspects of the present teachings and is not intended to limit the scope of the claims. Therefore, combinations of features disclosed in the detailed description may not be necessary to practice the teachings in the broadest sense and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Throughout the specification, claims, and drawings, the following terms take the meaning explicitly associated herein, unless the context clearly dictates otherwise. The term "herein" refers to the specification, claims, and drawings associated with the current application. The phrases "in one implementation," "in another implementation," "in various implementations," "in some implementations," "in other implementations," and other variations thereof refer to one or more features, structures, functions, limitations, or characteristics of the present disclosure, and are not limited to the same or different implementations unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful implementations of the present teachings.

It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples. Additionally, the headings and Abstract provided herein are for convenience only and do not limit the scope or meaning of the implementations.

FIG. 1 illustrates one implementation of a desalination system 100 that is used to perform desalination techniques as described herein. As illustrated in FIG. 1, the desalination system 100 includes a source or reservoir of saline solution or saline liquid, such as a body of liquid salt water 102, held in a container 104, such as a tank, vessel, basin, or other receptacle. In some implementations, the body of liquid salt water 102 may be seawater, for example, in a larger body of water. The desalination system 100 also includes a source of ultrasonic energy and/or ultrasound waves, which may be referred to as an ultrasound transmitter 106 and may take the form of an ultrasonic disc. In some implementations, the ultrasound transmitter 106 is positioned within the body of salt water 102, as illustrated in FIG. 1, while in other implementations, the ultrasound transmitter 106 is positioned within the container 104 but outside the body of salt water 102. That is, the transmitter 106 may be integral with the container 104 and therefore not technically within the container itself.

The ultrasound transmitter 106 is configured to convert electrical energy and/or electrical signals into ultrasonic energy and ultrasound waves, and may be configured to generate sound waves at greater than 18 kHz. The ultrasound transmitter 106 can include any known ultrasound transmitter devices, such as a piezoelectric transmitter or transducer, which can change its physical dimensions in response to an applied voltage, or a capacitive transmitter or transducer, which can oscillate a conductive diaphragm with respect to a backing plate in response to an applied voltage. Any other ultrasound transmitters known in the art may also be used, such as those that rely on magnetostriction.

The desalination system 100 also includes an acoustic mirror, which may also act as an acoustic lens, and which may be referred to as an "acoustic deflection plate" 108. In some embodiments, the acoustic deflector includes an acoustic lens feature that improves the resonant tuning of the container. In another aspect of some implementations, the deflection plate 108 is positioned within the body of salt water 102, as illustrated in FIG. 1, while in other implementations, the deflection plate 108 is positioned within the container 104 (i.e., part of the container) but outside the body of salt water 102. The container 104 includes an opening 110, which may be located at a top end of the container 104, through which aerosolized salt water may leave the container 104. The container also includes an aperture or drain 112, which may be located proximate a bottom end of the container 104 opposite the opening 110, through which salt water, such as concentrated or supersaturated salt water, or highly saline water, and/or brine, precipitated salt, or salt crystals, may leave the container 104.

In some implementations, the ultrasound transmitter 106 and the deflection plate 108 are mounted within the container 104 and within the body of salt water 102 at oblique angles to the orientation of gravity. In such implementations, salt that begins to crystalize on the ultrasound transmitter 106 or on the deflection plate 108 will tend to slide off such components and drift downward toward the bottom of the container 104 for removal via occasional purging via the drain 112. In the illustrated implementation, the container 104 has an overall cylindrical shape. In some implementations, however, the size and shape of the container 104, as well as the volume of the body of salt water 102 provided therein, the locations and orientations of the ultrasound transmitter 106 and the deflection plate 108, and the frequency at which the ultrasound transmitter 106 operates, may be optimized or tuned to create ultrasonic resonance within the container 104, such that the container becomes a resonant chamber, thereby improving or increasing the overall efficiency of the generation of an aerosol from the body of salt water 102. Such optimization or tuning may be based, at least in part, on the characteristics of the salt water supplied, such as its salinity and other properties.

In one implementation, a method of using the desalination system 100 may include supplying the body of salt water 102 to the container 104. The method may further include actuating or otherwise powering the ultrasound transmitter 106 to generate ultrasonic waves, such as ultrasonic waves greater than 18 kHz, within the body of salt water 102, where the ultrasonic waves are directed and travel from the ultrasound transmitter 106 toward the deflection plate 108. The ultrasonic waves may be incident upon and reflected by the deflection plate 108 such that they are directed and travel from the deflection plate 108 toward a free surface of the body of salt water 102.

The ultrasound waves, as they travel through and leave the body of salt water 102, nebulize or aerosolize the salt water at its free surface by generating a dispersion such as a mist or an aerosol of salt water particles above the body of liquid salt water 102. Generated aerosol particles may have diameters less than 1, less than 2, less than 3, less than 4, or less than 5 microns, and/or greater than 1, greater than 2, greater than 3, or greater than 4 microns, such as within a range of 3 to 5 microns. In other embodiments, the generated aerosol particles may have diameters greater than 5 microns. Thus, such components of the system 100 may be referred to collectively as a humidifier or an aerosolizer, and such techniques may be referred to as humidification or aerosolizing the body of salt water 102. In some implementations, an electromagnetic frequency is additionally applied to the body of liquid water 102, such as at or proximate the free surface thereof, which has been shown to decrease the surface tension of the water. See, for example, U.S. Pat. No. 7,544,323, which is incorporated herein by reference. Such techniques may, therefore, tend to improve or increase the efficiency of the aerosol generation by the ultrasound waves.

It has been shown that such techniques can be used to generate an aerosol of saltwater particles that has a lower concentration of salt than the body of liquid salt water 8102. Thus, such techniques leave the aerosolized salt water less saline, and the saltwater remaining in the body of liquid salt water 102 more saline. After the ultrasound transmitter 106 has been used to generate an aerosol in accordance with such techniques for a predetermined period of time, or until the salinity of the salt water remaining in the body of liquid salt water 102 reaches a predetermined level, the drain 112 may be opened to remove the relatively high salinity salt water, and/or any salt crystals that have formed, from the container 104, and the process may be repeated.

As illustrated in FIG. 1, the desalination system 100 also includes a separation conduit 114, which may include a hollow, elongated pipe, duct, channel, or tube. The separation conduit 114 illustrated in FIG. 1 has an overall shape comprising a hollow rectangular prism, but in other implementations, any other suitable geometric shape, cross sectional shape, or profile may be used. The separation conduit 114 has a first opening or entry 114a at a first end thereof and a second opening or exit 114b at a second end thereof opposite the first end. The separation conduit 114 has an overall length from the entry 114a to the exit 114b indicated by an arrow and a cross-sectional shape perpendicular to its length that is square or rectangular, although in other implementations, any other suitable cross-sectional shape may be used.

Given the cross-sectional shape of the separation conduit 114 illustrated in FIG. 1, the conduit 114 is formed by four longitudinally-extending elongate side walls that each extend from the entry 114a to the exit 114b, including a first elongate side wall 116a, a second elongate side wall 116b coupled at a right angle to the first elongate side wall 116a, a third elongate side wall 116c coupled at a right angle to the second elongate side wall 116b, and a fourth elongate side wall 116d coupled at a right angle to the third elongate side wall 116c and at a right angle to the first elongate side wall 116a. Thus, the first and third elongate side walls 116a and 116c extend parallel to one another and the second and fourth elongate side walls 116b and 116d extend parallel to one another. In some implementations, the interior surfaces of each of the side walls 116a, 116b, 116c, and 116d may have a hydrophilic coating to improve adhesion of liquid particles to, and collection of water particles on, the walls.

As also illustrated in FIG. 1, a first side or the first side wall 116a of the separation conduit 114 is electrically conductive and positively charged and an opposite side or the third side wall 116c of the separation conduit 114 is electrically conductive and negatively charged. For example, the first and third side walls 116a, 116c may be formed of metallic plates and may have an electric potential or voltage, as may be supplied by a battery or other suitable device, applied across them. Thus, an electric field, such as a polarized DC electric field, may be developed across, and extend through, the hollow space extending along the length of the separation conduit 114.

In one implementation, a method of using the desalination system 100 may include initially using the desalination system 100 as described above to generate an aerosol from the body of liquid salt water 102. The method may further include moving the generated aerosol, such as with a fan or other suitable device, from the opening 110 at the top of the container 102 to the entry 114a to the separation conduit 114. The method may further include using the fan or other suitable device to drive the aerosol to flow, such as under laminar flow conditions, into the separation conduit 114 through the entry 114a, through the separation conduit 114 from the entry 114a to the exit 114b, and out of the separation conduit 114 through the exit 114b. In some implementations, the separation conduit 114 includes one or more blades or fins that extend inward from one or more of the side walls 116a, 116b, 116c, and/or 116d, to help stabilize, or reduce a turbulence in the flow of air therethrough and maintain laminar flow conditions therein.

The method may further include applying an electric potential or voltage across the metallic plates of the first and third side walls 116a and 116c, thereby creating an electric field within the hollow separation conduit 114 and through which the aerosol flows as it travels from the entry 114a to the exit 114b. Because the first side wall 116a is electrically positively charged and the third side wall 116c is electrically negatively charged, more highly charged particles in the aerosol will migrate toward the one or the other of the first and third side walls 116a, 116c, such as due to ionic attraction between the particles and the side walls 116a, 116c. For example, negatively charged particles in the aerosol may migrate toward the positively charged first side wall 116a and positively charged particles in the aerosol may migrate toward the negatively charged third side wall 116c.

While the particles of the aerosol are expected to have a lower salt concentration than the body of liquid salt water 102, they will typically retain some concentration of salt. The concentration of salt and salt-forming cations and anions, such as sodium (Na+) and chloride (Cl−) will be unevenly distributed within the particles of the aerosol, such that some of the particles will be more highly-charged than others, such that the more highly-charged particles will be drawn toward the charged metallic plates of the first and second side walls 116a and 116c of the separation conduit 114. Further, the particles having higher concentrations of salt overall will tend to be more highly charged than other particles, such that separating the particles based on charge will effectively separate the particles by salt concentration. As a result, the aerosol particles leaving the separation conduit 114 through the exit 114b will tend to have a lower average concentration of salt than the aerosol particles entering the separation conduit 114 through the entry 114a.

Furthermore, it is expected that the average salinity of the aerosol particles travelling through the separation conduit 114 will decrease continuously with distance traveled through the separation conduit 114 from the entry 114a. It is therefore also expected that the average salinity of the aerosol particles collected on the walls of the separation conduit 114 will decrease with distance traveled through the separation conduit 114 from the entry 114a. Thus, the separation conduit 114 can include multiple water collection locations and corresponding drains through which the collected water may be removed from the separation conduit 114, to further separate the collected water by its salinity. In some implementations, higher salinity collected water can be diverted to an additional purification system, which may be another ultrasonic desalination system.

As illustrated in FIG. 1, the desalination system 100 may also include a condensation container 118, which may include a tank, vessel, basin, or other receptacle. In one implementation, a method of using the desalination system 100 may include initially using the desalination system 100 as described above to generate an aerosol from the body of liquid salt water 102, then using the separation conduit 114 as described above to separate aerosol particles of relatively low salinity from aerosol particles of relatively high salinity. The method may further include re-condensing the separated aerosol particles of relatively low salinity leaving the separation conduit 114 through the exit 114b and depositing the condensed liquid water into the condensation container 118. The water collected in the condensation container 118 will have a significantly lower salinity than the body of liquid salt water 102, as a result of aerosolizing the liquid salt water and separating the aerosol particles by salinity within the separation conduit 114. If the measured salinity of the condensed and collected water is low enough, the water can be considered potable and provided to potable water supply systems. If the measured salinity of the condensed and collected water is not low enough, the water can be diverted to an additional purification system, which may be another ultrasonic desalination system coupled in series to the first system. Alternatively, the condensed and collected water may be processed through the herein described desalination system 100 numerous times.

While the ultrasound waves generated by the systems described herein are described as being used to generate an aerosol from the body of liquid salt water 102, the ultrasound may also be used to kill unwanted pathogens in the water. While the systems described herein are described as using application of an electric potential or voltage to generate an electrical field to drive separation of aerosol particles, other implementations may use an applied magnetic field rather than, or in addition to, an electrical field. The desalination system 100 described herein may be powered by a solar power generation system. Other implementations may be powered by other sources of electrical power, and may be powered by electrical power provided by a utility power system. It is believed that the desalination techniques described herein may use only 10-20 percent as much energy as comparable evaporative or membrane-based desalination techniques.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:
1. A method of desalinating salt water, comprising:
supplying a container of liquid salt water;
operating an ultrasonic transmitter disposed within the container to generate a reduced-salinity aerosol at a surface of the liquid salt water and cause a crystallization of solid salt particles on a surface of the ultrasonic transmitter, wherein the reduced-salinity aerosol comprises positively and negatively electrically charged saltwater particles, and electrically neutral aerosol particles,
conveying the reduced-salinity aerosol through a conduit having a first internal surface and a second internal surface separating the positively and negatively electrically charged saltwater particles from the electrically neutral aerosol particles based on the first internal surface being positively charged and the second internal surface being negatively charged; and condensing the electrically neutral aerosol particles conveyed through the conduit to provide low salinity water.

2. The method of claim 1, further comprising applying an electromagnetic frequency to the liquid salt water sufficient to decrease surface tension of the liquid salt water in the container.

3. The method of claim 1, wherein conveying the reduced-salinity aerosol includes using a fan to convey the reduced-salinity aerosol through the conduit.

4. The method of claim 1, wherein conveying the reduced-salinity aerosol of saltwater includes conveying the reduced-salinity aerosol under laminar flow conditions.

5. The method of claim 1, further comprising:
supplying the low salinity water to a second container;
generating a second aerosol from the low salinity water in the second container; and
conveying the second aerosol through a second conduit having electrically charged internal surfaces for further desalinating the second aerosol.

6. The method of claim 1, further comprising:
causing the solid salt particles to slide off the ultrasonic transmitter towards a bottom end of the container based on the ultrasonic transmitter being oriented at an angle within the container.

7. The method of claim 1, further comprising:
purging the solid salt particles within the liquid salt water in the container via a drain disposed at a bottom end of the container.

8. The method of claim 1, wherein the conduit comprises a plurality of collection points along its length, and wherein the method further comprises:
collecting portions of the electrically neutral aerosol particles from the plurality of collection points, wherein at least some of the collected portions are diverted to a desalination system based on which ones of the plurality of collection points that they are collected from.

9. The method of claim 1, wherein the first internal surface and the second internal surface of the conduit include hydrophilic coating that causes the positively and negatively electrically charged saltwater particles to be separated from the electrically neutral aerosol particles based at least in part on adhesion.

10. The method of claim 1, further comprising:
tuning an output of the ultrasonic transmitter to be resonant with the container.

* * * * *